United States Patent
Wang et al.

(10) Patent No.: US 12,014,028 B2
(45) Date of Patent: Jun. 18, 2024

(54) APPLICATION PAGE DISPLAY METHOD AND ELECTRONIC DEVICE

(71) Applicant: BEIJING ZITIAO NETWORK TECHNOLOGY CO., LTD., Beijing (CN)

(72) Inventors: Yue Wang, Beijing (CN); Xiaolu Wang, Beijing (CN); Zengquan Huang, Beijing (CN); Yunpeng Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/453,031

(22) Filed: Aug. 21, 2023

(65) Prior Publication Data

US 2023/0400964 A1 Dec. 14, 2023

Related U.S. Application Data

(63) Continuation of application No. PCT/CN2022/076800, filed on Feb. 18, 2022.

(30) Foreign Application Priority Data

Feb. 24, 2021 (CN) .......................... 202110210236.8

(51) Int. Cl.
*G06F 3/0482* (2013.01)
*G06Q 50/00* (2012.01)

(52) U.S. Cl.
CPC ........... *G06F 3/0482* (2013.01); *G06Q 50/01* (2013.01)

(58) Field of Classification Search
CPC .............................. G06F 3/0482; G06Q 50/01
See application file for complete search history.

(56) References Cited

U.S. PATENT DOCUMENTS 10,529,035 B2 * 1/2020 Lam ..................... G06Q 50/01
10,747,400 B1 * 8/2020 Majumder ........... G06F 16/248
(Continued)

FOREIGN PATENT DOCUMENTS

CN 108235091 A 6/2018
CN 305154665 5/2019
(Continued)

OTHER PUBLICATIONS

International Search Report (with English translation) and Written Opinion issued in PCT/CN2022/076800, dated Apr. 25, 2022, 13 pages provided.

(Continued)

*Primary Examiner* — Anil K Bhargava
(74) *Attorney, Agent, or Firm* — HSML P.C.

(57) ABSTRACT

A method for displaying an application page includes: displaying a first page of a first application; determining a function introduction of a first function set, recommended content corresponding to the function introduction of the first function set, a function introduction of a second function set, and recommended content corresponding to the function introduction of the second function set that correspond to the user, the first function set being different from the second function set; and in response to receiving the first operation, displaying a second page, the second page displaying the function introduction of the first function set, the recommended content corresponding to the function introduction of the first function set, the function introduction of the second function set, and the recommended content corresponding to the function introduction of the second function set, the second page being different from the first page.

18 Claims, 7 Drawing Sheets

(56) References Cited

U.S. PATENT DOCUMENTS

| | | | | |
|---|---|---|---|---|
| 2012/0159337 A1* | 6/2012 | Travilla | ............ | G06Q 30/0631 |
| | | | | 715/738 |
| 2012/0271831 A1* | 10/2012 | Narayanan | ........ | G06F 16/24575 |
| | | | | 707/769 |
| 2013/0179802 A1* | 7/2013 | Martinazzi | ......... | G06Q 30/0269 |
| | | | | 715/753 |
| 2013/0332835 A1* | 12/2013 | Mace | ................ | H04N 21/4668 |
| | | | | 715/720 |
| 2013/0346877 A1* | 12/2013 | Borovoy | ............... | G06Q 50/01 |
| | | | | 715/753 |
| 2015/0154302 A1* | 6/2015 | Chatani | ............... | G06F 3/04817 |
| | | | | 715/745 |
| 2020/0304863 A1* | 9/2020 | Domm | .................... | H04L 67/55 |
| 2020/0322689 A1* | 10/2020 | Gao | ................ | H04N 21/47815 |

FOREIGN PATENT DOCUMENTS

| | | | |
|---|---|---|---|
| CN | 110611733 A | 12/2019 |
| CN | 112104899 A | 12/2020 |
| CN | 112256164 A | 1/2021 |
| CN | 112948038 A | 6/2021 |

OTHER PUBLICATIONS

Wei, Jiamin, How to Buy Something with Aliplay?, [Baidu Jingyan, online] https://jingyan.baidu.com/article/b24f6c82952b06c6bfe5dad5.html, dated Nov. 14, 2019, 7 pages.

European Search Report issued in 22758807.6, dated May 15, 2024, 9 pages provided.

* cited by examiner

APPLICATION PAGE DISPLAY METHOD AND ELECTRONIC DEVICE

This application is a continuation of International Application No. PCT/CN2022/076800, filed on Feb. 18, 2022 which claims priority to Chinese Patent Application No. 202110210236.8, titled "APPLICATION PAGE DISPLAY METHOD AND ELECTRONIC DEVICE", filed on Feb. 24, 2021 with the China National Intellectual Property Administration, both of which are incorporated herein by reference in their entireties.

FIELD

The present disclosure relates to the technical field of communication and in particular to a method for displaying an application page and an electronic device.

BACKGROUND

Figure 1A:
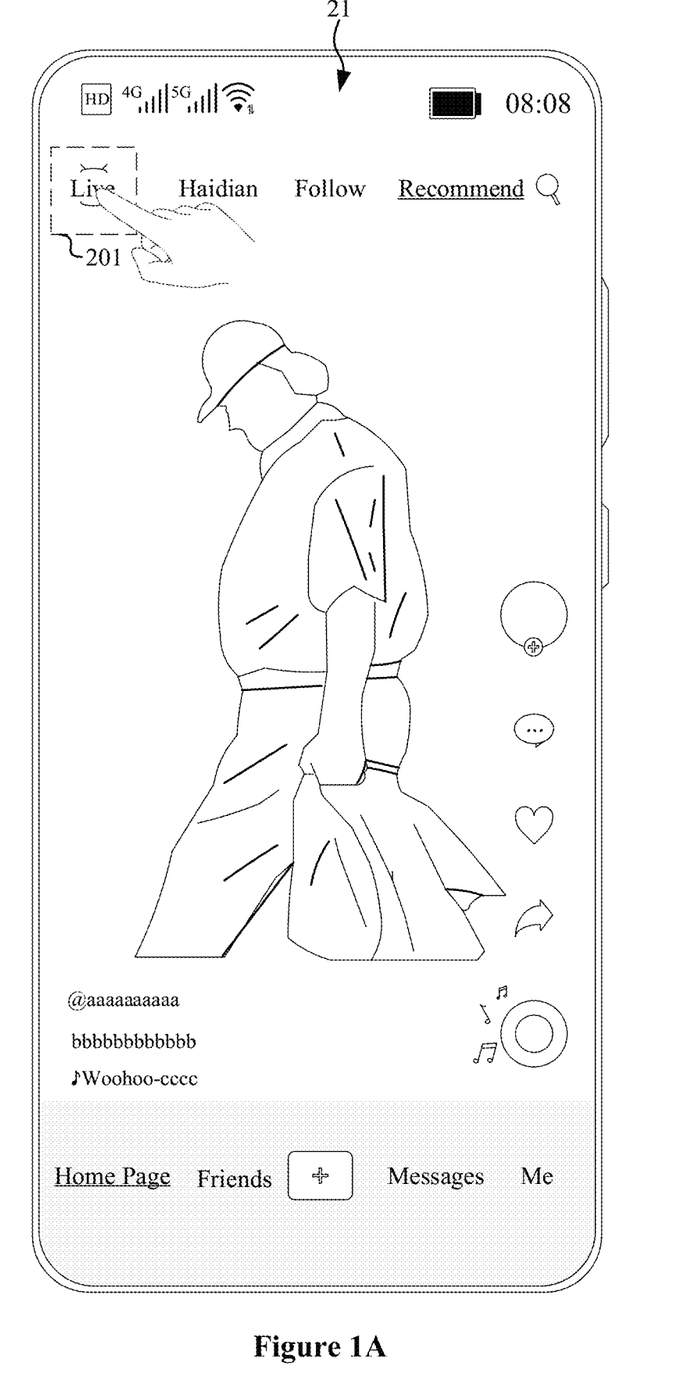
FIG. 1A-1B are schematic diagrams of a human-computer interaction interface.
Figure 1B:
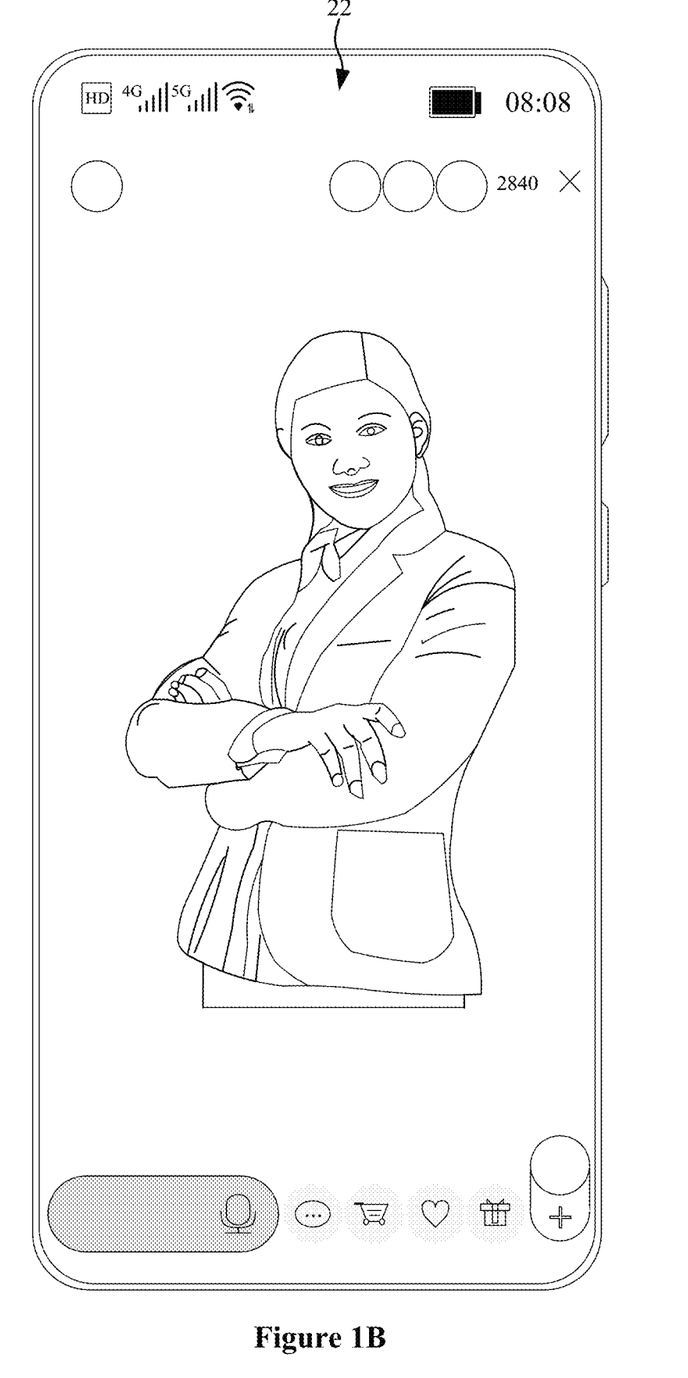

In an application (APP) page, an entrance usually serves a function set which is composed of one or more functions of the APP. For example, in the home page 21 of the short video social APP shown in FIG. 1A, a "Live" control 201 is displayed at the upper left corner. The "Live" control 201 is an entrance for a function set for live streaming. In response to clicking on the "Live" control 201, a full-screen live streaming page 22 can be entered as shown in FIG. 1B. Apparently, the APP entrance has a poor extensibility, making it impossible for the user to discover other function sets of the APP, which degrades the user experience.

SUMMARY

In order to solve or at least partly solve the above technical problems, a method for displaying an application page and an electronic device are provided according to the present disclosure.

In a first aspect, a method for displaying an application page is provided according to the present disclosure. The method includes: displaying a first page of a first application; determining a function introduction of a first function set, recommendation content corresponding to the function introduction of the first function set, a function introduction of a second function set and recommendation content corresponding to the function introduction of the second function set, where the function introduction of the first function set, the recommendation content corresponding to the function introduction of the first function set, the function introduction of the second function set and the recommendation content corresponding to the function introduction of the second function set all correspond to a user, and the first function set is different from the second function set; and displaying a second page in response to a first operation of the user on the first page, where the second page includes: the function introduction of the first function set, and the recommendation content corresponding to the function introduction of the first function set, the function introduction of the second function set, and the recommendation content corresponding to the function introduction of the second function set; and the second page is different from the first page.

With the method provided by the first aspect, the electronic device can display a second page including the function introduction and recommendation content of the first function set and the function introduction and recommendation content of the second function set, in response to receiving the first operation of the user on the first page. In this way, the electronic device can display partial solutions of multiple function sets to the user in a personalized manner, which helps the user to discover multiple function sets of the application program, facilitates the user to quickly understand the functions of respective function sets, and enables the user to quickly select a function set to use. In addition, the recommendation target of the function sets can be accurately presented to the user, so that the user can quickly acquire the target that the user is interested in or the current news in the function sets. In this way, the time cost for the user selecting the function set is shortened, the entrance extensibility of the application program is improved, and the experience of the user while using the application program is improved.

In a possible implementation, a presenting style of the function introduction or the recommendation content includes at least one of an icon, a text, a picture and a video.

In a possible implementation, in a case that the function introduction is presented in a presenting style of the icon, the recommendation content corresponding to the function introduction is presented in an icon corresponding to the function introduction.

In a possible implementation, the function introduction or the recommendation content is related to historical browsing content of the user in the first application, so that the electronic device can present each function set on the second page in a personalized manner.

In a possible implementation, the method further includes: displaying, in response to a second operation of the user on a function set selected from the first function set and the second function set in the second page, a page corresponding to a selected function set.

In a possible implementation, the determining a function introduction of a first function set, recommendation content corresponding to the function introduction of the first function set, a function introduction of a second function set and recommendation content corresponding to the function introduction of the second function set includes: receiving a recommendation solution after the first application is initiated or receiving a recommendation solution in response to the first operation; and determining, based on the recommendation solution, presenting content and a presenting style of the function introduction of the first function set, presenting content and a presenting style of the recommendation content corresponding to the function introduction of the first function set, presenting content and a presenting style of the function introduction of a second function set, and presenting content and a presenting style of the recommendation content corresponding to the function introduction of the second function set.

In this way, the electronic device can display partial solutions of multiple function sets to the user in a personalized manner, which facilitates the user to quickly understand the functions of respective function sets, and can accurately present the recommendation target of the function sets to the user. Thus, the user can quickly acquire the target that the user is interested in or the current news in the function sets, thereby reducing the cost of the user selecting the function sets.

In a possible implementation, the second page covers a partial area of the first page, to present multiple function sets in detail on the second page.

In a possible implementation, the displaying the first page of the first application includes: playing multimedia information on the first page; and the displaying the second page includes: playing the multimedia information on the first page, when displaying the second page.

In a possible implementation, the second page covers an entire area of the first page, to present multiple function sets in detail on the second page.

In a possible implementation, the method further includes: displaying the first page, in response to a third operation of the user on the first page and/or the second page. In this way, the electronic device can exit the second page.

In a second aspect, an electronic device is provided according to the present disclosure. The electronic device includes: a memory and a processor. The memory is configured to store program instructions. The processor is configured to invoke program instructions in the memory to cause the electronic device to implement the method for displaying the application page according to the first aspect and any possible implementations of the first aspect.

In a third aspect, a computer storage medium is provided according to the present disclosure. The computer storage medium includes computer instructions, and the computer instructions, when running on an electronic device, cause the electronic device to implement the method for displaying the application page according to the first aspect and any possible implementations of the first aspect.

In a fourth aspect, a computer program product is provided according to the present disclosure. The computer program product, when running on a computer, causes the computer to implement the method for displaying the application page according to the first aspect and any possible implementations of the first aspect.

In a fifth aspect, a chip system is provided according to the present disclosure, the chip system includes a processor. When the process executes computer instructions stored in the memory, the electronic device implements the method for displaying the application page according to the first aspect and any possible implementations of the first aspect.

BRIEF DESCRIPTION OF THE DRAWINGS

The drawings herein are incorporated into the specification and constitute a part of the specification, which show embodiments which comply with the present disclosure. The drawings and the specification are used as a whole to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Exemplarily, a method and apparatus for displaying an application page, a device, a computer storage medium and a computer program product are provided according to the present disclosure. The function introduction and recommendation content of multiple function sets are displayed on a page corresponding to one entrance of the application program in a personalized manner. In this way, the types presented on the page are enriched to enable users to fast understand the functions of the function sets. In addition, it can enable the users to accurately acquire target information such as user interested or current news, which helps the users to quickly select function sets for use, reduces the cost of the user sorting the function sets, improves the extensibility of the application entrance, and elevates the user experience when using the application program.

In addition, when the application program displays the page corresponding to the entrance, the application program can still continue to execute the function corresponding to the previous page. Hence, the two operations, i.e., presenting the page corresponding to the entrance and executing the function corresponding to the previous page, will not interfere with each other, which will not influence the user experience.

In the present disclosure, the method for displaying an application page is implemented by an electronic device. The electronic device may be a tablet computer, a mobile phone (such as a folding screen mobile phone, a large-screen mobile phone, etc.), wearable device, vehicle-mounted device, augmented reality (AR)/virtual reality (VR) device, notebook computer, ultra-mobile personal computer (UMPC), netbook, personal digital assistant (PDA), and the internet of things (IOT) device such as smart TV, smart screen, high-definition TV, 4K TV, smart speaker, smart projector, etc. The specific type of electronic device is not limited in the present disclosure.

In addition, the type of the operating system is not limited in the present disclosure. For example, the operating system may be an Android system, Linux system, Windows system, iOS system, etc.

Based on the foregoing description, an electronic device is taken as an example in an embodiment according to the present disclosure to describe the method for displaying the application page in detail in combination with the drawings and application scenarios.

With reference to FIGS. 2A to 2D, a specific implementation process of a method for displaying an application page according to the present disclosure is provided. For the convenience of explanation, the electronic device is a mobile phone, and the short video social APP 1 (hereinafter referred to as application 1) is installed in the mobile phone as an example for illustration, in the FIGS. 2A to 2D.

FIGS. 2A to 2D are schematic flowcharts of a method for displaying an application page according to an embodiment of the present disclosure.

Figure 2A:
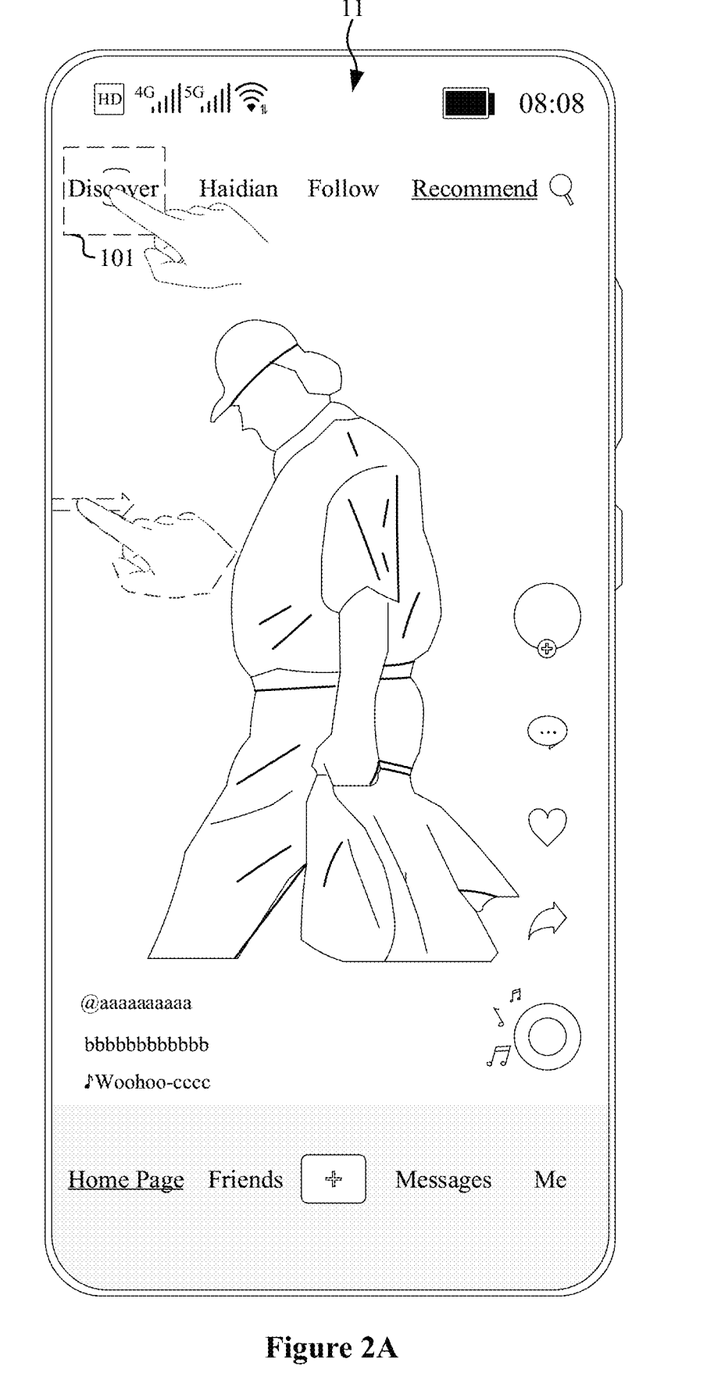
FIG. 2A-2D are schematic diagrams of human-computer interaction interfaces according to an embodiment of the present disclosure.

The application 1 may display the user interface 11 shown in FIG. 2A on the mobile phone, and the user interface 11 is used to display the home page of the application 1. The application 1 performs a certain function, such as playing multimedia information (such as short videos), in the home page of application 1. The user interface 11 may include: a control 101 configured to enter a discovery page of the application 1. The discovery page is used to present three function sets of the application 1, i.e., a live streaming room, a good things recommendation and a music recommendation.

Figure 2B:
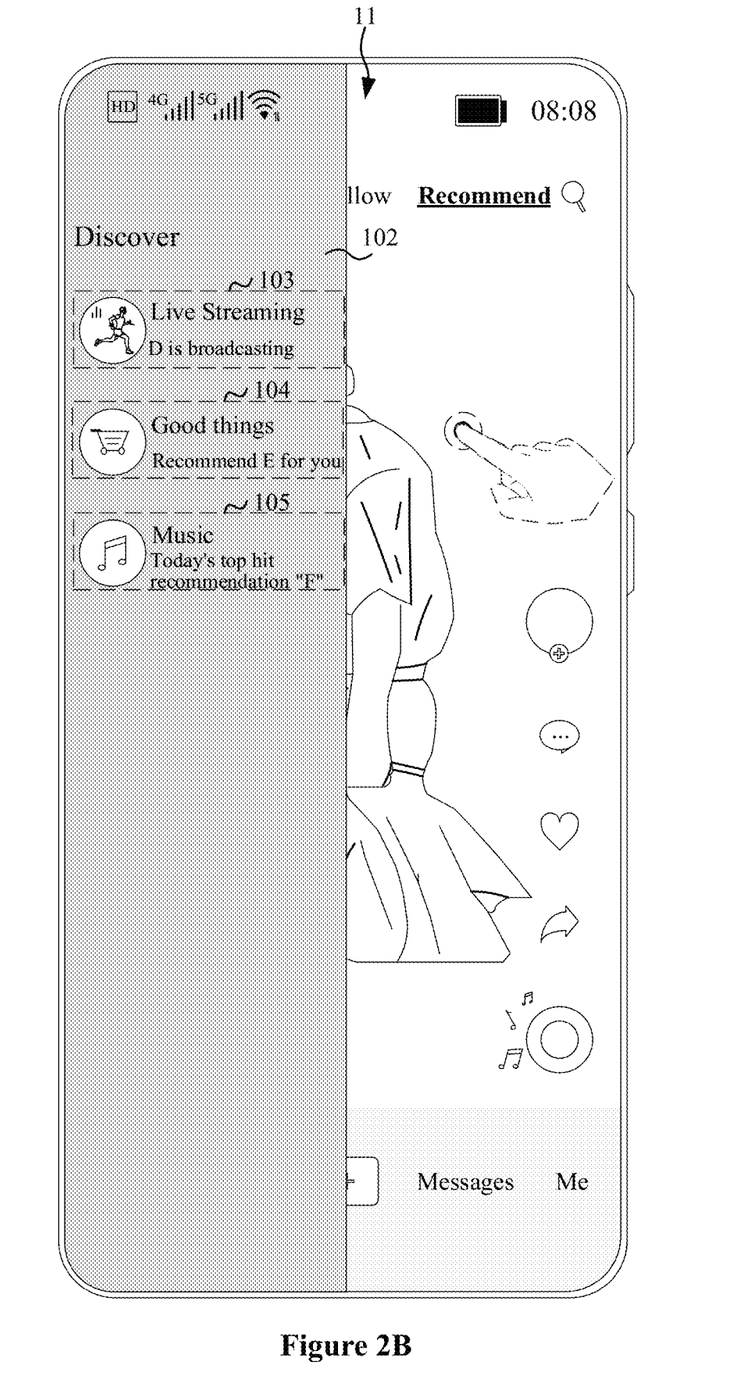

After the application 1 receives the operation of the user such as clicking the control 101 in the user interface 11 shown in FIG. 2A, the application 1 may display the window 102 shown in FIG. 2B on the user interface 11. The window 102 is used to display discovery page.

The window 102 is displayed in a sidebar style and covers a partial area of the user interface 11. It should be noted that the area of the user interface 11 covered with the window 102 may be an area in the user interface 11, and the parameter such as a size, a position, a shape, and a background color of the area is not limited in the present disclosure.

The window 102 may include: a display area 103, a display area 104 and a display area 105.

The display area 103 is used to display a function set of the application 1, and the function set is used to provide an entrance to the live streaming room. For example, in FIG. 2B, application 1 uses a live streaming room icon (icon) and the text "Live Streaming" to show a function introduction of the function set to the user. Application 1 may apply the text "D is on live" to show recommendation content of this function set to the user. That is, the live streaming room of D that is broadcasting is recommended. In addition, the icon of the live streaming room here can use a default icon or the current image of D's live streaming room, etc.

The display area 103 is further used to enter a page corresponding to the function set. In some embodiments, the page may be a function page corresponding to the function set. The function page may display various live streaming rooms in the form of an icon, a text, a picture, a video and the like. For example, the current screen of the live streaming room that is broadcasting is displayed in a window (i.e., displayed in a card form), or a cover of the live streaming room that does not broadcast is displayed, or the above two methods are combined to display. The specific representation of the page is not limited in the present disclosure. In some other embodiments, the page may be a page corresponding to the recommendation content of the function set. For example, the page may be a current screen of a live streaming room. For example, the live streaming room corresponding to the recommendation content is displayed in full screen.

The display area 104 is used to display a function set of the application 1. The function set is used to provide an entrance to good things recommendation. For example, in FIG. 2B, the application 1 uses a good things recommendation icon and the text "Good things" to show a function introduction of the function set to the user. The application 1 applies the text "Recommend E for you" to show the recommendation content of this function set to the user. That is, the good thing E is recommended. In addition, the good things recommendation icon may use a default icon, or a cover or introduction video of the good thing E.

The display area 104 is further used to enter a page corresponding to a function set. In some embodiments, the page may be a function page corresponding to the function set, and the function page may display various good things in the form of an icon, a text, a picture, a video. For example, an image of the good thing in the live streaming room that is broadcasting is displayed in a window, or the introduction video of the good things is displayed in a window, or the cover of the good things is displayed, or at least two of the above three methods are combined to display. The specific representation of the page is not limited in the present disclosure. In other embodiments, the page may be the page corresponding to the recommendation content of the function set. The page may be a purchase page of a good thing or a current screen of the live streaming room in which is broadcasting to describe the good thing. For example, the purchase page of the good thing corresponding to the recommendation content is displayed in full screen.

The display area 105 is used to display a function set of the application 1. The function set is used to provide an entrance to music recommendation. For example, in FIG. 2B, the application 1 uses a music recommendation icon and the text "Music" to show a function introduction of the function set to the user. Application 1 uses the text "Today's top hit recommendation "F"" to show recommendation content of this function set to the user. That is, a today's top hit song "F" is recommended. In addition, the music recommendation icon here may be a default icon, or a cover or a music video (MV) of the song "F".

The display area 105 is further used to enter a page corresponding to the function set. In some embodiments, the page may be a function page corresponding to the function set, and the function page can display various songs in the form of an icon, a text, a picture, a video and the like. For example, the MV image of the top song in the weekly hit list and the covers of other songs in the weekly hit list are displayed in a window, or each music in the monthly hit list is displayed in text, or the above two methods are combined to display. The specific representation of the page is not limited in the present disclosure. In some other embodiments, the page may be a page corresponding to recommendation content of the function set. The page may be a play page or MV of a certain song. For example, the play page of the song corresponding to the recommendation content is displayed in full screen.

Moreover, at the same time as the application 1 being displaying the window 102, the application 1 continues to play the multimedia information on the home page of the application 1. One function set in the window 102 may present an image and play a corresponding audio. In this case, the multimedia information on the home page of the application 1 has no sound. Alternatively, the function set in window 102 may display an image without sound. In this case, the multimedia information with sound may be played on the home page of application 1.

Based on the above description, the application 1 can display the intuitive functions and recommendations of multiple function sets to users in a personalized manner through a page corresponding to an entrance (using the sidebar style). The function corresponding to the previous page can continue being executed (multimedia information is played) while the application 1 is displaying the page.

In addition, in addition to the sidebar style, the application 1 may also use other page styles to present multiple function sets to the user.

Figure 2C:
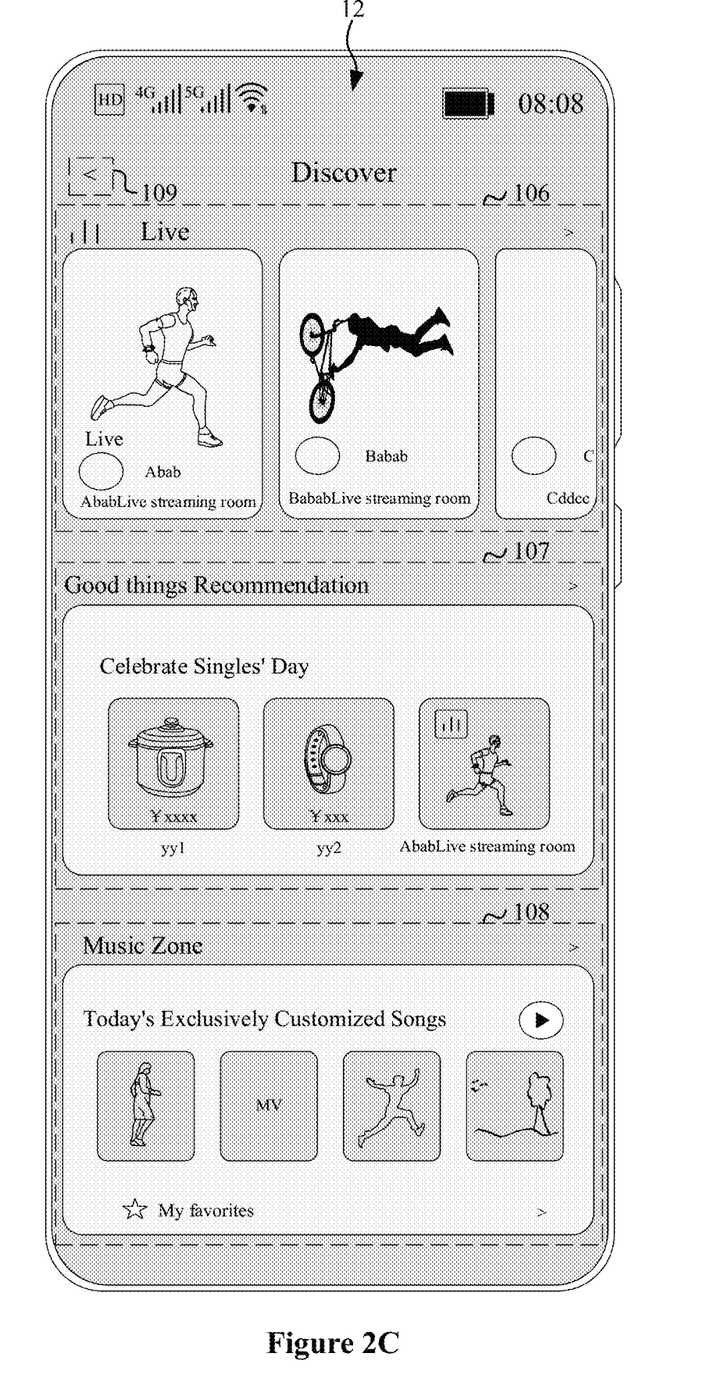

After the application 1 receives an operation performed by the user on the user interface 11 shown in FIG. 2A, such as clicking on the control 10, the application 1 may display a user interface 12 exemplarily shown in FIG. 2C. The user interface 12 is used to display a discovery page of the application 1.

The user interface 12 uses a tiled style. The user interface 12 covers the entire area of the user interface 11. The user interface 12 may include: a display area 106, a display area 107 and a display area 108.

The display area 106 is used to display a function set of the application 1. The function set is used to provide an entrance to the live streaming room. For example, in FIG. 2C, the application 1 uses a live streaming room icon (icon) and the text "Live" to show the function introduction of the function set to the user. Application 1 shows recommendation content of this function set to the user by means of playing in windows and/or displaying covers. That is, multiple live streaming rooms that are broadcasting are recommended. For example, a current image of the first live streaming room (i.e., Abab's live streaming room) is played in a window, as well as a cover of the other live streaming room (i.e., Babab's live streaming room) is displayed.

In addition, after receiving an operation of the user clicking a live streaming room, the mobile phone may display the current image of the live streaming room in full screen. After receiving an operation of the user sliding the other live streaming room except the first live streaming room to the position of the first live streaming room, the mobile phone can display the current image of the other live streaming room in the window at the position of the first live streaming room.

The display area 106 is further used to enter the page corresponding to the function set. The detail of this page may refer to the description of the page corresponding to the function set in the display area 103, which will not be repeated herein.

The display area 107 is used to display a function set of the application 1. The function set is used to provide an entrance to good things recommendation. For example, in FIG. 2C, the application 1 uses a good things recommendation icon and the text "good things recommendation" to show the function introduction of the function set to the user. Recommendation content of this function set is displayed by the application 1 to the user by at least one of: displaying a cover in the window, playing an introduction video in the window, and playing a live streaming room in the window. That is, the best-selling good things with the title "Celebrate Singles' Day" is recommended.

In addition, after receiving an operation of the user clicking a good thing, the mobile phone may display a purchase page of the good thing in full screen. After receiving the sliding operation performed by the user, the mobile phone may display other good things with the title "Celebrate Singles' Day" in the window.

The display area 107 is further used to enter a page corresponding to the function set. The detail of this page may refer to the description of the page corresponding to the function set in the display area 104, which will not be repeated here.

The display area 108 is used to display a function set of the application 1. The function set is used to provide an entrance to music recommendation. For example, in FIG. 2C, the application 1 uses a music recommendation icon and the text "Music Zone" to show a function introduction of the function set to the user. Recommendation content of this function set is displayed by the application 1 to the users by manners of: displaying a cover and/or playing MV in the windows and so on. That is, songs with the title "Today's Exclusively Customized Songs" are recommended, and the songs that the user has favorited are displayed to the user by the icon and text "My Favorites".

In addition, after receiving an operation of the user clicking a song, the mobile phone may display a playing page of the song in full screen. After receiving the sliding operation performed by the user, the mobile phone may display other songs with the title "Today's Exclusively Customized Songs" in a window.

The display area 108 is further used to enter the page corresponding to the function set. The detail of this page may refer to the description of the page corresponding to the function set in the display area 105, which will not be repeated here.

Based on the above description, the application 1 can display detailed functions and multiple recommendations of multiple function sets to users in a personalized manner through a page corresponding to an entry (in a tiled style).

It should be noted that, in addition to the operation of clicking the control 101, the application 1 may also display the discovery page of the application 1 after receiving an operation performed by the user such as sliding to the left/right in the user interface 11. In addition, no control 101 is displayed in the user interface 11, such as the user interface 13 exemplarily shown in FIG. 2D. The user interface 13 is used to display a main page (i.e., the home page) of the application 1.

Figure 2D:
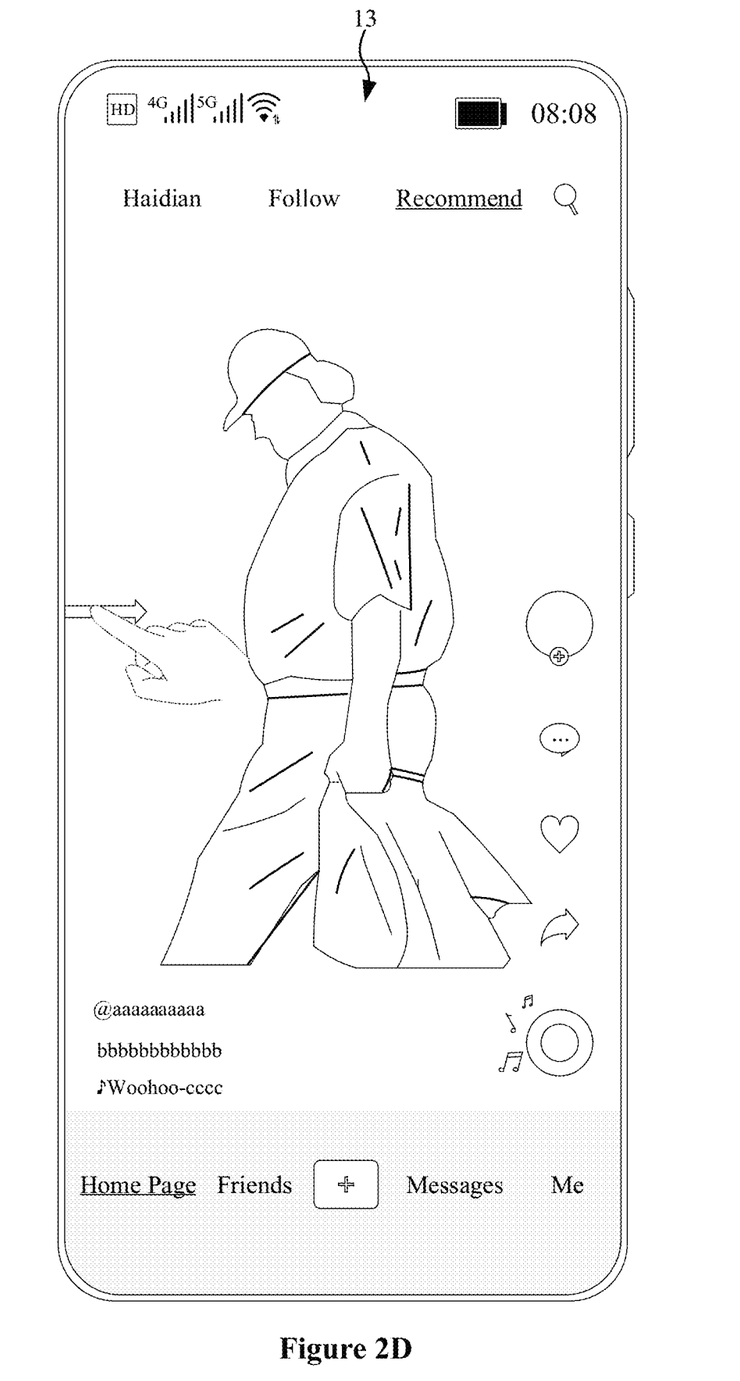

After the application 1 receives the operation performed by the user such as sliding to the left/right on the screen of the mobile phone in the user interface 13 shown in FIG. 2D, the application 1 may display the window 102 shown in FIG. 2B on the user interface 13, Alternatively, the application 1 may display the user interface 12 exemplarily shown in FIG. 2C on the mobile phone.

In addition, the application 1 may also exit the discovery page of the application 1.

After receiving the operation performed by the user such as sliding to the right/left on the screen of the mobile phone shown in FIG. 2B or FIG. 2C, the application 1 may display the user interface 11 shown in FIG. 2A on the mobile phone. Alternatively, the application 1 may display the user interface 13 exemplarily shown in FIG. 2D on the mobile phone.

It should be noted that the gesture of entering the discovery page of application 1 is usually opposite to the gesture of exiting the discovery page of application 1. For example, the operation of sliding to the left is used to enter the discovery page of application 1, and the operation of sliding to the right is used to exit the discovery page of application 1.

Alternatively, after receiving an operation performed by the user such as clicking on the control 109 in the user interface 12 shown in FIG. 2C, the application 1 may display on the mobile phone, the user interface 11 shown in FIG. 2A or the user interface 13 exemplarily shown in FIG. 2D on the mobile phone.

Figure 3:
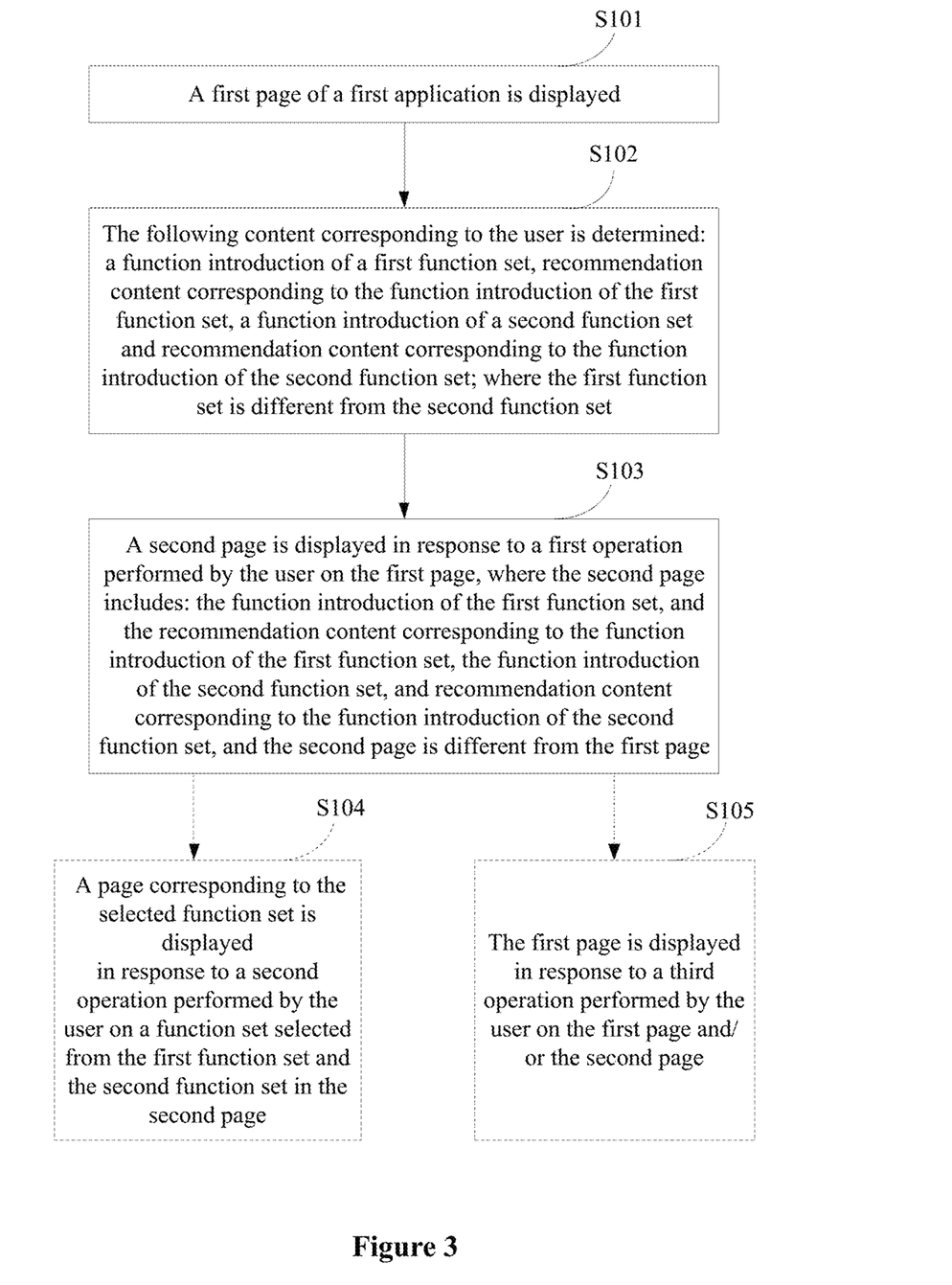
FIG. 3 is a flowchart of a method for displaying an application page according to an embodiment of the present disclosure.

Based on the description of the embodiment in FIG. 2A to FIG. 2D, with reference to FIG. 3, a specific implementation process of a method for displaying an application page according to the present disclosure is described in detail.

Referring to FIG. 3, FIG. 3 is a flowchart of a method for application page display according to an embodiment of the present disclosure. As shown in FIG. 3, the method for application page display according to the present disclosure may include steps S101 to S105 as follows.

In S101, a first page of a first application is displayed.

The first page may be a page of the first application. For example, the first page may be a home page of the first application, or a page in the first application other than the home page.

In some embodiments, when the first application is an application 1. The specific implementation of the first page may refer to the description of user interface 11 in the embodiment of FIG. 2A, or refer to the description of user interface 13 in the embodiment of FIG. 2D, which will not be repeated here.

In S102, the following content corresponding to the user is determined: a function introduction of a first function set, recommendation content corresponding to the function introduction of the first function set, a function introduction of a second function set and recommendation content corresponding to the function introduction of the second function set; where the first function set is different from the second function set.

Based on the current user, the electronic device acquires a function introduction of the first function set, recommendation content corresponding to the function introduction of the first function set, a function introduction of the second function set, and recommendation content corresponding to the function introduction of the second function set.

The function introduction of the function set is a related description or prompt of the function set, and the function introduction may indicate the functions included in the function set. The recommendation content corresponding to the function introduction of the function set can be understood as recommendation content of the functions contained in the function set.

The specific implementation of the function introduction of the first function set or the second function set may refer to the description of the function introduction of function sets in FIG. 2A to 2D. The specific implementation of the recommendation content corresponding to the function introduction of the first function set or the second function set may refer to the description of the recommendation content of the function sets in FIG. 2A to 2D, which will not be repeated here.

Generally, for different users, the same function set has the same function. However, the function introductions and/or recommendation contents of the same function set for different users may be different.

In some embodiments, for the function sets included in the second page, the function introduction and recommendation content of each function set are related to historical browsing content of the user in the first application. Thus, the electronic device can present the function introduction and recommendation content of each function set via the second page in a personalized manner. That is, the electronic device presents different second pages to different users. For example, user 1 often browses good things, e.g., oranges, in the first application 1; and user 2 often browses good things, e.g., combs, in the first application. Then, the electronic device recommends different good things for the user 1 and user 2 in the function set corresponding to good things recommendation. In addition, the function introduction and recommendation content of each function set are also related to content such as current hot news, a region where the user is located, etc., for example, holidays, Singles' Day festival, etc.

The function introduction has two parameters of presenting content and presenting style. In some embodiments, the presenting style of the function introduction includes at least one of an icon, a text, a picture and a video.

The recommendation content has two parameters of presenting content and presenting style. In some embodiments, the presenting style of the recommendation content includes at least one of an icon, a text, a picture and a video. For example, the current image of the live streaming room, the introduction photo of the good things, the introduction video of the good things, the video clip corresponding to the good things in the live streaming room, the cover of the song, the MV of the song, etc. are used.

In addition, the function introduction and recommendation content in the same function set may be combined with each other for presentation. In some embodiments, when the function introduction uses the presenting style of the icon, the corresponding recommendation content is presented in the icon corresponding to the function introduction. For example, the icon is displayed in the display area 103 in the embodiment of FIG. 2B.

In S103, a second page is displayed in response to a first operation performed by the user on the first page, where the second page includes: the function introduction of the first function set, and the recommendation content corresponding to the function introduction of the first function set, the function introduction of the second function set, and recommendation content corresponding to the function introduction of the second function set, and the second page is different from the first page.

The user may perform the first operation on the first page. The electronic device may receive the first operation performed by the user. The first operation may include, but be not limited to click, double click, long press, slide and other types of operations.

In some embodiments, when the first control is provided on the first page, the first operation is an operation on the first control. For example, the first operation may be an operation of the user clicking on the control 101 in the embodiment of FIG. 2A. The first control is used to provide an entrance to the second page. Parameters, such as a shape, a size, a color, and a position, of the first control are not limited in the present disclosure. For example, the specific implementation of the first control may refer to the description of the control 101 in the embodiment of FIG. 2A, which will not be repeated here.

In other embodiments, the first operation is an operation satisfying the first preset gesture. For example, the first operation may be a sliding operation of the user to the left/right on the screen of the mobile phone in the embodiment of FIG. 2A. As another example, the first operation may be a sliding operation of the user to the left/right on the screen of the mobile phone in the embodiment of FIG. 2D. The specific implementation of the first preset gesture is not limited in the present disclosure. For example, the first preset gesture may include sliding to the left/right, or sliding up/down.

After receiving the first operation, the electronic device may display the function introduction of the first function set and the function introduction of the second function set on the second page, to help the user to understand the first function set and the second function set to a certain extent. In addition, the recommendation content of the first function set and the recommendation content of the second function set are further displayed on the second page, to accurately recommend to the user the target information that the user is interested in, and shortens the time for the user selecting the function.

The second page is a page of the first application. Content of the first page may be the same as or different from content of the second page, which is not limited in the present disclosure.

In some embodiments, when the first application is application 1, the specific implementation of the second page may refer to the description of window 102 in the embodiment of FIG. 2B, or refer to the description of user interface 12 in the embodiment of FIG. 2C, which will not be repeated here.

In addition, in addition to serving the first function set and the second function set, the second page may further serve other function sets of the first application. Parameters, such as quantity and type of function sets corresponding to the second page, are not limited in the present disclosure.

In some embodiments, the second page corresponds to the first function set, the second function set and the third function set, the first application is a short video social application program, and the first function set is a function set corresponding to a live streaming room, the second function set is a function set corresponding to the good things recommendation, and the third function set is a function set corresponding to the music recommendation. In this case, the second page may include a function introduction of live streaming rooms with the recommended live streaming room, a function introduction of the good things recommendation with the recommended good things, and a function introduction of the music recommendation with the recommended music.

In some embodiments, the function introduction and recommendation content of each function set are usually displayed in the same area on the second page.

The specific implementation of the first function set may refer to the description of the display area 103 in the window 102 in the embodiment of FIG. 2B, or refer to the description of the display area 106 in the user interface 12 in the embodiment of FIG. 2C, which will not be repeated here.

The specific implementation of the second function set may refer to the description of the display area 104 in the window 102 in the embodiment of FIG. 2B, or refer to the description of the display area 107 in the user interface 12 in the embodiment of FIG. 2C, which will not be repeated here.

The specific implementation of the third function set may refer to the description of the display area 105 in the window 102 in the embodiment of FIG. 2B, or refer to the description of the display area 108 in the user interface 12 in the embodiment of FIG. 2C, which will not be repeated here.

In addition, the same area on the second page is further used to enter the page corresponding to the corresponding function set. The specific implementation of the page corresponding to each function set may refer to the description of the display area 103, display area 104, and display area 105 in the window 102 in the embodiment of FIG. 2B, or refer to the description of the display area 106, display area 107, and display area 108 in the user interface 12 in the embodiment of FIG. 2C, which will not be repeated here.

In S104, in response to a second operation performed by the user on a function set selected from the first function set and the second function set in the second page, a page corresponding to the selected function set is displayed.

The user may perform a second operation on a function set selected from the first function set and the second function set in the second page. The electronic device may receive the second operation.

After receiving the second operation, the electronic device may display a page corresponding to the selected function set, for example, display images including multiple live streaming rooms or display an image of one live streaming room.

Step S104 is an optional step. The second operation may include but not limited to click, double click, long press, slide and other types of operations.

In some embodiments, the second operation may be an operation performed by the user on the display area 103, display area 104, and display area 105 in the embodiment of FIG. 2B to enter the pages corresponding to the respective function sets. Alternatively, the second operation may be an operation performed by the user on the display area 106, display area 107, and display area 108 in the embodiment of FIG. 2C to enter the pages corresponding to the respective function sets. The page corresponding to the selected function set may refer to the description of the page corresponding to the function set in embodiment in FIG. 2B or FIG. 2C, which will not be repeated here.

In S105, the first page is displayed in response to a third operation performed by the user on the first page and/or the second page.

The user may perform a third operation on the first page and/or the second page. The electronic device may receive the third operation. The third operation may include, but be not limited to, click, double click, long press, sliding and other types of operations. In addition, when performing the third operation, the user may touch the first page, or the second page, or the first page and the second page.

In some embodiments, when a second control is provided on the first page, the third operation is an operation on the second control. For example, the third operation may be an operation performed by the user of clicking the control 109 in the embodiment of FIG. 2C. The second control is used to provide an entrance to exit of the second page. Parameters such as a shape, a size, a color, and a position, of the second control are not limited in the present disclosure. For example, the specific implementation manner of the second control may refer to the description of the control 109 in the embodiment of FIG. 2C, which will not be repeated here.

In some other embodiments, the third operation is an operation satisfying the second preset gesture. For example, the third operation may be a sliding operation to the right/left on the screen of the mobile phone performed by the user in the embodiment of FIG. 2B or FIG. 2C. The second preset gesture is usually opposite to the first preset gesture.

After receiving the third operation, the electronic device may exit the second page and display the first page. In this way, the electronic device can fully realize the display and exit of the second page.

Step S105 is an optional step.

With the method for displaying the application page according to the present disclosure, the electronic device can display a second page including the function introduction and recommendation content of the first function set and the function introduction and recommendation content of the second function set, in response to receiving the first operation performed by the user on the first page. In this way, the electronic device can display partial solutions of multiple function sets to the user in a personalized manner, which helps the user to discover multiple function sets of the application program, facilitates the user to quickly understand the functions of respective function sets, and enables the user to quickly select a function set to use. In addition, the recommendation target of the function sets can be accurately presented to the user, so that the user can quickly acquire the target that the user is interested in or the current news in the function sets. In this way, shorten the time cost for the user selecting the function set is shortened, the entrance extensibility of the application program is improved, and the experience of the user while using the application program is elevated.

In step S102 shown in the embodiment in FIG. 3, the electronic device may use various methods to determine the function introduction of the first function set, the recommendation content corresponding to the function introduction of the first function set, the function introduction of the second function set, and the recommendation content corresponding to the function introduction of the second function set, so that the electronic device can present the second page in a personalized manner.

In some embodiments, the electronic device may receive a recommendation solution from a service provider after the first application is initiated. Alternatively, the electronic device may receive the recommendation solution from the service provider in response to receiving the first operation.

Since an application programming interface (API) is pre-configured between the first application and the service provider. Therefore, once the first application is initiated, the electronic device may acquire the recommendation solution from the service provider through the configured API. Alternatively, after receiving the first operation, the electronic device may acquire the recommendation solution from the service provider through the configured API.

The service provider provides sources of the content of the first function set and the second function set. The service provider of the first function set may be the same as or different from the service provider of the second function set.

The recommendation solution includes presenting content and presenting styles of the function introduction and the recommendation content of the first function set on the second page, and presenting content and presenting styles of the function introduction and the recommendation content of the second function set on the second page. In addition, the recommendation solution is related to the historical browsing content of the user and current hot news in the first application.

For example, when the electronic device displays the icon of the function set corresponding to the live streaming room on the second page, the default icon of the function set corresponding to the live streaming room may be presented to the user, or a current image of the live streaming room that is broadcasting may be presented to the user in the icon.

Therefore, based on parameters such as the recommendation solution and the display decision of the application program, the electronic device may determine presenting content and a presenting style of the function introduction of the first function set, presenting content and a presenting style of the recommendation content corresponding to the function introduction of the first function set, presenting content and a presenting style of the function introduction of a second function set, and presenting content and a presenting style of the recommendation content corresponding to the function introduction of the second function set.

In the present disclosure, the electronic device may present the second page in various styles.

In some embodiments, the second page may be presented in a sidebar style to cover a partial area of the first page, so that the function introduction and recommendation content of the first function set and the second function set can be displayed regionally by means of the second page. Parameters such as the size, the position, and the area of the region of the first page covered with the second page are not limited in the present disclosure.

In addition, when the first page corresponds to the multimedia information of the first application, the electronic device may continue to play the multimedia information on the first page while displaying the second page, to maintain the playing state of the multimedia information.

In some other embodiments, the second page may be displayed in a tiled style, to cover the entire area of the first page. In this way, the second page can present the function introduction of the first function set and the second function set, as well as more quantities and types of the recommendation content in detail.

Exemplarily, an electronic device is provided according to the present disclosure, the electronic device includes: one or more processors; a memory; and one or more computer programs. The one or more computer programs are stored in the memory. The one or more processors, when executing the one or more computer programs, cause the electronic device to implement the method for displaying the application page according to the foregoing embodiments.

Exemplarily, a chip system is provided according to the present disclosure, which is applied to an electronic device including a display screen, a memory, and a sensor. The chip system includes: a processor. The processor implements the application page display according to the foregoing embodiments.

Exemplarily, a computer storage medium is provided according to the present disclosure, on which a computer program is stored. The computer program, when executed by a processor, causes an electronic device to implement the application page display according to the foregoing embodiments.

Exemplarily, a computer program product is provided according to the present disclosure. The computer program product, when running on a computer, causes the computer to implement the application page display according to the foregoing embodiments.

In the above embodiments, all or part of the functions may be implemented by software, hardware, or a combination of software and hardware. When implemented by software, it may be implemented in whole or in part in the form of a computer program product. A computer program product includes one or more computer instructions. When the computer program instructions are loaded and executed on the computer, the processes or functions according to the embodiments of the present disclosure are produced in whole or in part. A computer can be a general purpose computer, special purpose computer, computer network, or other programmable device. Computer instructions may be stored on a computer readable storage medium. The computer readable storage medium may be any available medium that can be accessed by a computer, or a data storage device such as a server, a data center, etc. integrated with one or more available media. The available media may be magnetic media (e.g., floppy disk, hard disk, magnetic tape), optical media (e.g., DVD), or semiconductor media (e.g., solid state disk (SSD)) and the like.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A method for displaying an application page, comprising:
    displaying a first page of a first application;
    determining a function introduction of a first function set, recommendation content corresponding to the function introduction of the first function set, a function introduction of a second function set and recommendation content corresponding to the function introduction of the second function set, wherein the function introduction of the first function set, the recommendation content corresponding to the function introduction of the first function set, the function introduction of the second function set and the recommendation content corresponding to the function introduction of the second function set correspond to a user, and the first function set is different from the second function set; and
    displaying a second page, in response to a first operation performed by the user on the first page, wherein the second page is different from the first page; and the second page comprises: the function introduction of the first function set, the recommendation content corresponding to the function introduction of the first function set, the function introduction of the second function set, and the recommendation content corresponding to the function introduction of the second function set,
    wherein the determining the function introduction of the first function set, the recommendation content corresponding to the function introduction of the first function set, the function introduction of the second function set and the recommendation content corresponding to the function introduction of the second function set comprises:
        receiving a recommendation solution after the first application is initiated or receiving a recommendation solution in response to the first operation; and
        determining, based on the recommendation solution, presenting content and a presenting style of the function introduction of the first function set, presenting content and a presenting style of the recommendation content corresponding to the function introduction of the first function set, presenting content and a presenting style of the function introduction of the second function set, and presenting content and a presenting style of the recommendation content corresponding to the function introduction of the second function set.

2. The method according to claim 1, wherein a presenting style of the function introduction or the recommendation content comprises at least one of an icon, a text, a picture and a video.

3. The method according to claim 2, wherein in a case that the function introduction is presented in the presenting style of the icon, the recommendation content corresponding the function introduction is presented in the icon corresponding to the function introduction.

4. The method according to claim 1, wherein the function introduction or recommendation content is related to historical browsing content of the user in the first application.

5. The method according to claim 1, further comprising:
    displaying, in response to a second operation performed by the user on a function set selected from the first function set and the second function set in the second page, a page corresponding to a selected function set.

6. The method according to claim 1, wherein the second page covers a partial area of the first page.

7. The method according to claim 6,
    wherein the displaying the first page of the first application comprises:
        playing multimedia information on the first page; and
    wherein the displaying the second page comprises:
        playing the multimedia information on the first page, while displaying the second page.

8. The method according to claim 1, wherein the second page covers an entire area of the first page.

9. The method according to claim 1, further comprising:
    displaying the first page, in response to a third operation performed by the user on the first page and/or the second page.

10. An electronic device, comprising:
    a display screen;
    one or more processors;
    a memory; and
    one or more computer programs;
    wherein the one or more computer programs are stored in the memory and the one or more computer programs, when executed by the one or more processors, cause the electronic device to:
        display a first page of a first application;
        determine a function introduction of a first function set, recommendation content corresponding to the function introduction of the first function set, a function introduction of a second function set and recommendation content corresponding to the function introduction of the second function set, wherein the function introduction of the first function set, the recommendation content corresponding to the function introduction of the first function set, the function introduction of the second function set and the recommendation content corresponding to the function introduction of the second function set correspond to a user, and the first function set is different from the second function set;
        display a second page, in response to a first operation performed by the user on the first page, wherein the second page is different from the first page; and the second page comprises: the function introduction of the first function set, the recommendation content corresponding to the function introduction of the first function set, the function introduction of the second function set, and the recommendation content corresponding to the function introduction of the second function set;

receive a recommendation solution after the first application is initiated or receive a recommendation solution in response to the first operation; and determine, based on the recommendation solution, presenting content and a presenting style of the function introduction of the first function set, presenting content and a presenting style of the recommendation content corresponding to the function introduction of the first function set, presenting content and a presenting style of the function introduction of the second function set, and presenting content and a presenting style of the recommendation content corresponding to the function introduction of the second function set.

11. The electronic device according to claim 10, wherein a presenting style of the function introduction or the recommendation content comprises at least one of an icon, a text, a picture and a video.

12. The electronic device according to claim 11, wherein in a case that the function introduction is presented in the presenting style of the icon, the recommendation content corresponding the function introduction is presented in the icon corresponding to the function introduction.

13. The electronic device according to claim 10, wherein the function introduction or recommendation content is related to historical browsing content of the user in the first application.

14. The electronic device according to claim 10, wherein the one or more computer programs, when executed by the one or more processors, cause the electronic device to:

display, in response to a second operation performed by the user on a function set selected from the first function set and the second function set in the second page, a page corresponding to a selected function set.

15. The electronic device according to claim 10, wherein the second page covers a partial area of the first page.

16. The electronic device according to claim 10, wherein the second page covers an entire area of the first page.

17. The electronic device according to claim 10, wherein the one or more computer programs, when executed by the one or more processors, cause the electronic device to:

display the first page, in response to a third operation performed by the user on the first page and/or the second page.

18. A non-transitory computer storage medium, comprising computer instructions, wherein the computer instructions, when running on an electronic device, cause the electronic device to:

display a first page of a first application;

determine a function introduction of a first function set, recommendation content corresponding to the function introduction of the first function set, a function introduction of a second function set and recommendation content corresponding to the function introduction of the second function set, wherein the function introduction of the first function set, the recommendation content corresponding to the function introduction of the first function set, the function introduction of the second function set and the recommendation content corresponding to the function introduction of the second function set correspond to a user, and the first function set is different from the second function set;

display a second page, in response to a first operation performed by the user on the first page, wherein the second page is different from the first page; and the second page comprises: the function introduction of the first function set, the recommendation content corresponding to the function introduction of the first function set, the function introduction of the second function set, and the recommendation content corresponding to the function introduction of the second function sets;

receive a recommendation solution after the first application is initiated or receive a recommendation solution in response to the first operation; and determine, based on the recommendation solution, presenting content and a presenting style of the function introduction of the first function set, presenting content and a presenting style of the recommendation content corresponding to the function introduction of the first function set, presenting content and a presenting style of the function introduction of the second function set, and presenting content and a presenting style of the recommendation content corresponding to the function introduction of the second function set.

* * * * *